May 28, 1935.   L. L. LOMAR   2,002,700
SHOCK ABSORBER
Filed Nov. 21, 1932   3 Sheets-Sheet 1
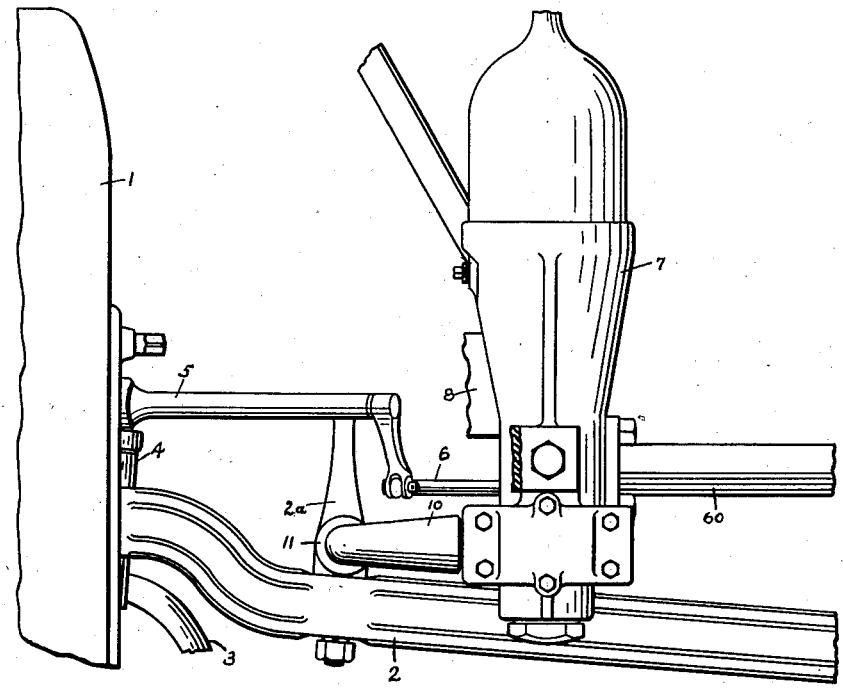
FIG 1.
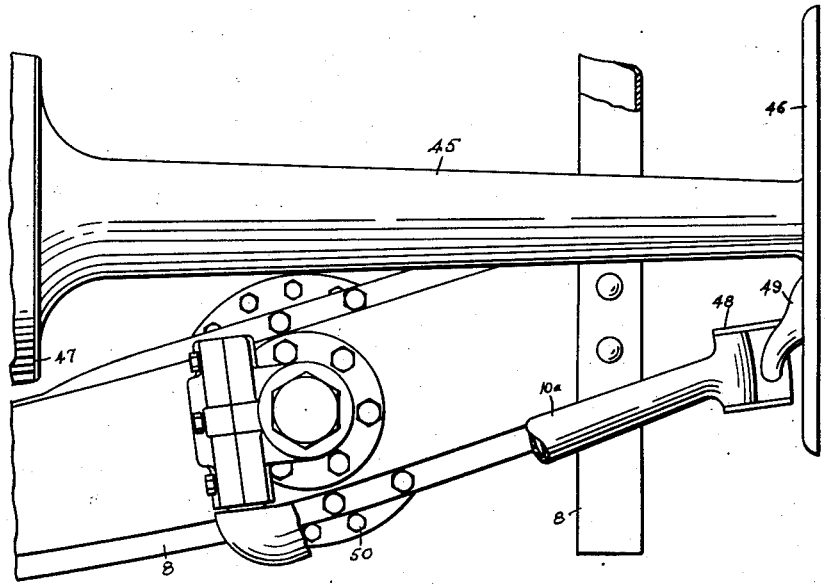
FIG 2.   L. L. LOMAR   INVENTOR.
BY *J. Vincent Martin*
ATTORNEY.

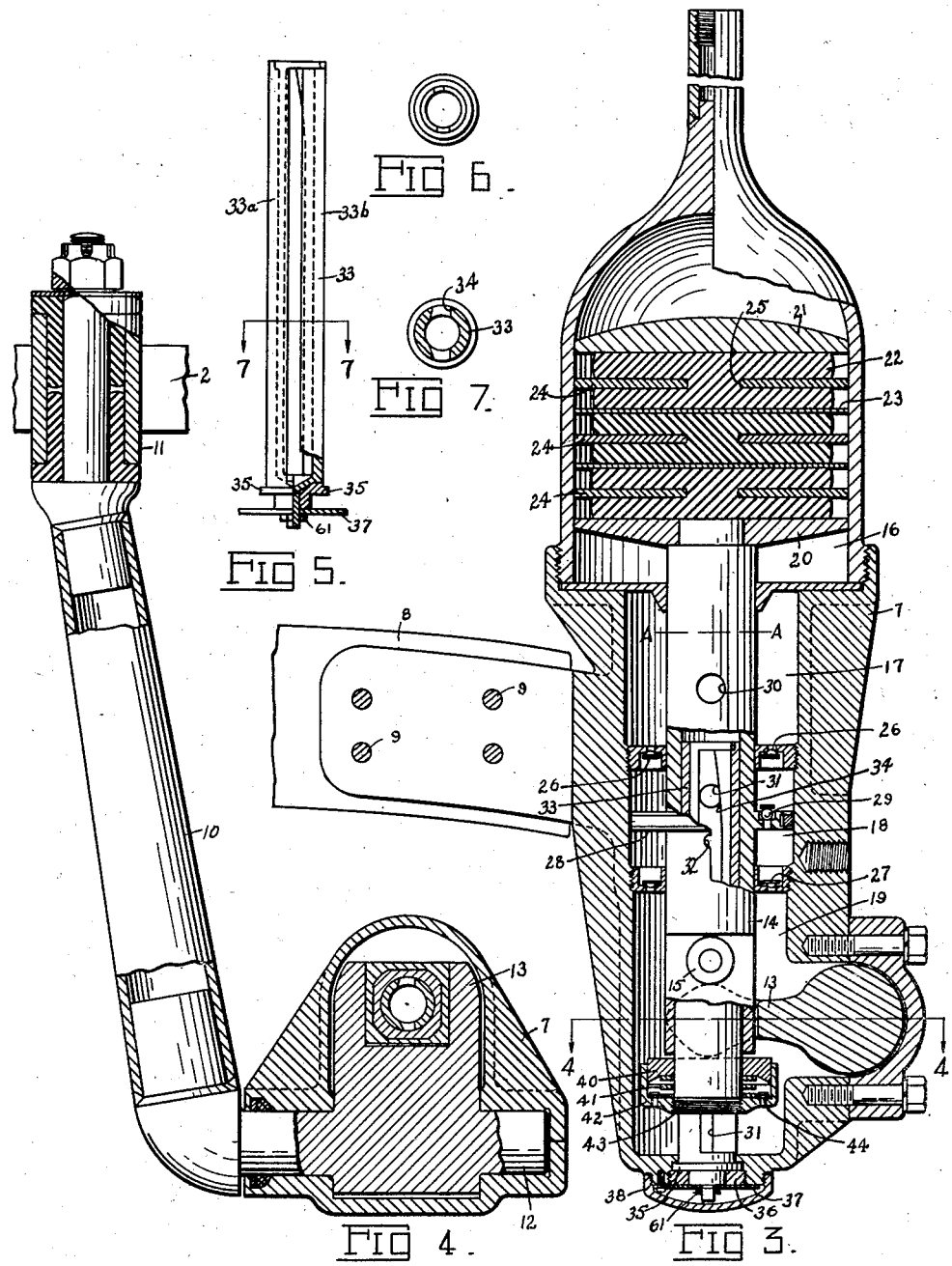

May 28, 1935.  L. L. LOMAR  2,002,700
SHOCK ABSORBER
Filed Nov. 21, 1932  3 Sheets-Sheet 3

L. L. LOMAR INVENTOR.

BY *J. Vincent Martin*

ATTORNEY.

Patented May 28, 1935

2,002,700

UNITED STATES PATENT OFFICE 2,002,700

SHOCK ABSORBER

Louis L. Lomar, Houston, Tex.

Application November 21, 1932, Serial No. 643,582

6 Claims. (Cl. 267—35)

This invention relates generally to shock absorbers and specifically to shock absorbers for automobiles and the like.

The conventional automobile includes a body, axles, springs between the body and axles and a shock absorber to resist the rebound of the springs.

In my Letters Patent of the United States Number 1,776,388, of September 23, 1930, I have disclosed a shock absorber that offers practically no resistance to slight or normal movements of vehicle springs but that offers the desired resistance to abnormal movements thereof, the parts being so adjustable that the compression resistance and rebound resistance may be varied independently of each other.

The present invention has for its general object the provision of a new and improved unitary shock absorber, whereby the body of a vehicle may be resiliently connected to the axles thereof to eliminate the use of springs.

The specific objects of my invention will hereinafter appear.

Figure 8:
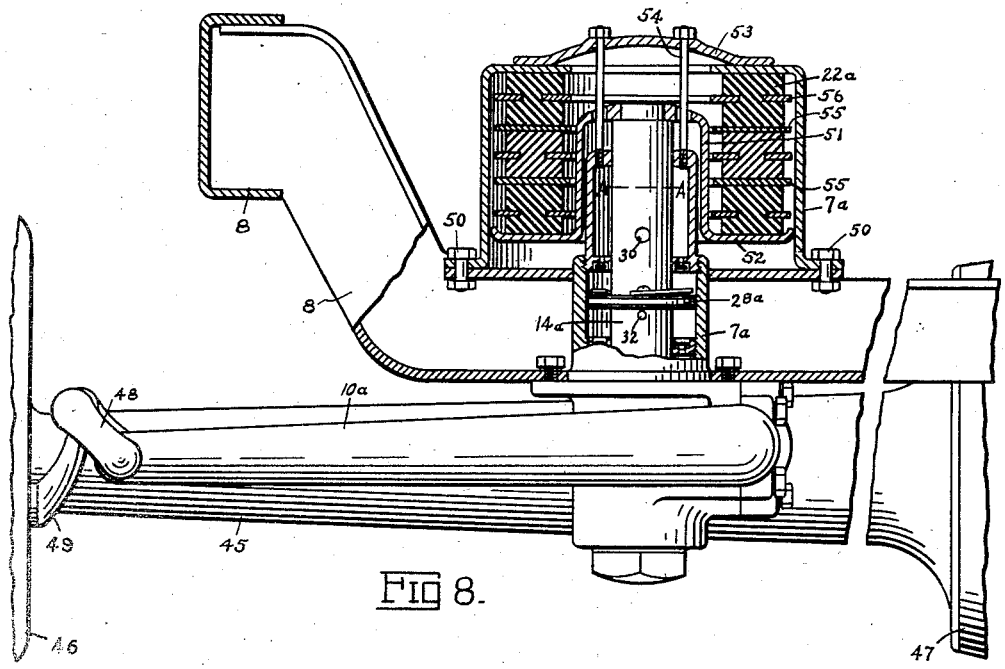

In the accompanying drawings, Fig. 1 is a front elevation of the preferred embodiment of my shock absorber interposed between the body and the right front portion of the axle of a vehicle; Fig. 2, a bottom plan view of another embodiment of my shock absorber mounted on the left portion of the rear axle of the vehicle; Fig. 3 a sectional elevation of the embodiment of the shock absorber shown by Fig. 1; Fig. 4 a view taken from the line 4—4 of Fig. 3; Fig. 5 a partly sectional elevation of the valves; Fig. 6 a top plan view of the valve; Fig. 7 a horizontal section on the line 7—7 of Fig. 5; Fig. 8 a rear elevation of the shock absorber shown by Fig. 2 mounted on the left portion of the rear axle of a vehicle; and Fig. 9 a detail view illustrating the compression of the rubber pads of the shock absorber shown by Fig. 8.

The drawings disclose fragmentarily a number of conventional parts of an automobile.

For instance, in Fig. 1 the front right tire is indicated at 1, the front axle at 2, the spindle arm at 3, the kingpin at 4, the brake arm at 5 and the brake rod at 6. The casing 7 of the shock absorber is mounted on the front right end 8 of the body (Figs. 1 and 3) by means of rivets or bolts 9. The lever 10 of the shock absorber is connected to the bracket 2a as indicated at 11. One shock absorber is mounted on each side of the front of the vehicle. The right front absorber just referred to may be connected to the left front absorber (not shown) by the bar 60.

It will be obvious that the body of the vehicle cannot move toward or away from the axle without moving the lever 10 and this invention provides means which will now be described, operating to control the movement of the lever and thereby control the movement of the axle with respect to the body to absorb objectionable shocks.

Referring to Figs. 3 and 4, it will be seen that the lever 10 has a shaft 12 journalled for rotation in the casing 7. Integral with the shaft 12 is a forked cam 13 which bears against a pair of rollers carried by the piston rod 14, one of said rollers being shown at 15.

The casing 7 is divided into four chambers, 16, 17, 18 and 19. The piston rod 14 extends from the chamber 19 through the chambers 18 and 17 into the chamber 16 and has on its end a plate 20. In the chamber 16 is an abutment 21 and between the plate 20 and abutment 21 are a plurality of resilient rubber pads 22 between which are rigid metal discs 23 and embedded in which are rigid metal discs 24, having central openings 25. The chambers 17, 18 and 19 are filled with liquid such as oil about up to the level indicated by the line A—A. Between the chambers 17 and 18 are valves 26 to permit the passage of fluid only from the chamber 17 to the chamber 18. These valves may be normally held closed by suitable springs. Between the chambers 18 and 19 are valves 27 to permit the passage of fluid only from the chamber 19 to the chamber 18. These valves may also be normally held closed by suitable springs.

Carried by the rod 14 is a piston 28, having therein a valve 29 to permit the passage of fluid upwardly therethrough when the piston 28 moves downwardly and to prevent the passage of fluid therethrough when said piston moves upwardly. This valve 29 may also be normally held closed by a suitable spring.

The passage of the fluid through the rod 14 from one side of the piston 28 to the other is controlled by means quite similar to that disclosed by my said Letters Patent 1,776,388. The rod 14 is hollow and has an opening 30 therein communicating with the chamber 17 and openings 31 and 32 communicating with the chamber 18 on opposite sides of the piston. Within the rod 14 is a tubular valve 33 which is shown by Figs. 3 to 7 inclusive. This valve 33 is longitudinally divided into two arcuate sections 33a and 33b to form an elongated slot 34. The section 33a has a ring 35 on its lower end that is clamped between the end wall of the casing 7 and the nut 36. The lower end of the section 33b is locked in the ring 35 by the nut 61. The section 33a may be locked in the desired position by the nut 36 and the section 33b may be held in the desired position with respect to section 33a by the disc 37 and then locked in place by the nut 61. The parts are covered by the cap 38.

The arms of the cam 13 are kept in contact with the rollers 15 on the rod 14 by a holding device comprising a ring 40 yieldably held in engagement with the cam arms by the spring 41. The ring 40 and spring 41 are within a housing 42 which is threaded on the end of the rod 14 as indicated at 43 and has therein valved openings 44.

The operation of this shock absorber is as follows:

If the vehicle strikes an obstacle in the road the axle 2 is moved toward the frame 8 of the body, the lever arm 10 being thereby rotated on its pivot 12 in a clockwise direction (Fig. 3) and the arms of the cam 13 are thereby made to actuate the rollers 15 to move the rod 14 upwardly. This movement is resisted by the rubber pads 22 which are compressed by the plate 20 carried by the rod 14 toward the abutment 21. If the movement is very rapid it is also resisted by the fluid in the casing, because when the rod 14 is moved upwardly the piston 28 is moved upwardly and the fluid trapped in the chamber 18 above the piston 28 must escape through the opening 31 and slot 34 into the valve 33, from which a portion of said fluid will pass upwardly and out through the opening 30 into the chamber 17, and another portion will pass downwardly through the valve and into the chamber 19. At the same time the fluid must enter the chamber 18 below the piston 28 through the valves 27, slot 34 and opening 32.

The resistance offered to the passage of the fluid through the opening 31 in the rod 14 may be varied by making the slot 34 angular and adjusting the sections 33a and 33b of the valve by the means described above, which are similar to the corresponding means shown in my said Letters Patent No. 1,776,338.

Now the rubber pads being resilient and having been compressed, as above stated, will rebound to force the piston rod 14 downwardly and thereby force the body frame 8 and the axle 2 away from each other. A too sudden movement of the body and axle away from each other is prevented by the fluid in the casing because when the rod 14 is forced downwardly it carries the piston 28 downwardly and the fluid trapped in the chamber 18 below the piston 28 must escape through the valves 29 into that part of chamber 18 above the piston 28 and through the opening 32 in the rod 14 through the slot 34 into the tubular valve 33 and from said valve 33 into the chambers 17 and 19. When this occurs the valves 26 may also open to permit the passage of fluid from the chamber 17 into that part of chamber 18 above the piston 28.

Figure 9:
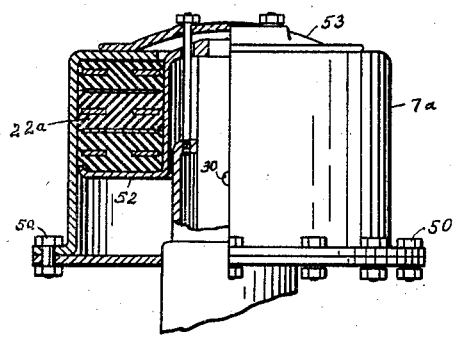

The shock absorber shown by Figs. 2, 8 and 9, which is adapted for use in connection with the rear axle of the vehicle is the same as the shock absorber adapted for use in connection with the front axle just described except that the rubber pads are constructed and mounted somewhat differently so that the shock absorber occupies less space. In Figs. 2, 8 and 9 the rear axle is indicated at 45, the brake drum of one of the rear wheels at 46, the differential at 47 and the body frame at 8. The lever 10a of the shock absorber is connected to the axle by means of the shackle 48 and bracket 49 secured to the brake drum 46 on the axle 45. The casing of the shock absorber is indicated at 7a, the piston rod at 14a and the piston at 28a.

The rubber pads are formed in rings 22a within the portion 7a' of the casing which is bolted to the frame 8 as indicated at 50. Carried by the piston rod 14a is an inverted cup-shaped member 51 having an annular flange 52. The rings 22a are disposed between the annular flange 52 of said member and the abutment formed by the end wall of the casing 7a'. The casing 7a' may be covered by a suitable cap 53 held in place by bolts 54 connected to the stationary portion 7b of the casing.

The rubber pads 22a are formed in rings and between them are placed rigid metal rings 55 and embedded in the rubber rings 22a are rigid metal rings 56. When the body 8 and axle 45 are in normal positions with respect to each other, the rubber pads 22a are as shown by Fig. 8. When the vehicle strikes an obstacle in the road which effects upward movement of the rod 14a by rocking the lever arm 10a the member 51 is thereby moved upwardly and its annular flange 52 causes compression of the rubber pads as shown by Fig. 9. When the rubber pads rebound they force the member 51 downwardly whereby the piston rod 14 is forced downwardly and the lever 10a is rocked to move the axle and body away from each other. Both the compression and the rebound of these rubber pads are resisted by the hydraulic parts of the shock absorber which are the same as shown by the other figures.

The invention is not limited to the preferred embodiment herein disclosed. Various changes may be made within the scope of the following claims.

I claim:

1. The combination with a vehicle having a body and an axle, of a unitary shock absorber comprising a casing mounted on said body; said casing having four chambers; a piston rod reciprocable in said chambers; an abutment in the first of said chambers; resilient means to resist the movement of said rod toward said abutment, said means comprising a plurality of resilient rubber pads and a plurality of rigid discs between said pads, said pads and discs being between said rod and said abutment; the second, third and fourth of said chambers being adapted to contain a fluid; a piston carried by said rod in the third of said chambers; said piston having therein a valve opening toward said pads; a valve between the second and third of said chambers to permit the flow of fluid only from the second of said chambers into the third of said chambers; a valve between the third and fourth of said chambers to permit the flow of fluid only from the fourth of said chambers into the third of said chambers; said rod being hollow and having openings communicating with the second, third and fourth of said chambers; means whereby the flow of fluid through said openings may be controlled; and a lever pivoted in said casing, operatively associated with said rod and connected to said axle.

2. The combination with a vehicle having a body and an axle, of a unitary shock absorber comprising a casing mounted on said body; said casing having four chambers; a piston rod reciprocable in said chambers; an abutment in the first of said chambers; resilient means to resist the movement of said rod toward said abutment; said means being between said rod and said abutment; the second, third and fourth of said chambers being adapted to contain a fluid; a piston carried by said rod in the third of said chambers; said piston having therein a valve opening toward said resilient means; a valve between the second and third of said chambers to permit the flow of fluid only from the second of said chambers into the third of said chambers; a valve between the third and fourth of said chambers to permit the flow of fluid only from the fourth of said chambers into the third of said chambers; said rod being hollow and having openings communicating with the second, third and fourth of said chambers; means whereby the flow of fluid through said openings may be controlled; and a lever pivoted in said casing, operatively associated with said rod and connected to said axle.

3. The combination with a vehicle having a body and an axle, of a unitary shock absorber comprising a casing mounted on said body; said casing having four chambers; a piston rod reciprocable in said chambers; an abutment in the first of said chambers; resilient means to resist the movement of said rod toward said abutment, said means being between said rod and said abutment; the second, third and fourth of said chambers being adapted to contain a fluid; a piston carried by said rod in the third of said chambers; said piston having therein a valve opening toward said resilient means; a valve between the second and third of said chambers to permit the flow of fluid only from the second of said chambers into the third of said chambers; a valve between the third and fourth of said chambers to permit the flow of fluid only from the fourth of said chambers into the third of said chambers; said rod being hollow and having openings communicating with the second, third and fourth of said chambers; means whereby the flow of fluid through said openings may be controlled; and means connecting said rod and said axle.

4. The combination with a vehicle having a body and an axle, of a unitary shock absorber comprising a casing mounted on said body; said casing having four chambers; a piston rod reciprocable in said chambers; an abutment in the first of said chambers; resilient means to resist the movement of said rod toward said abutment, said means being between said rod and said abutment; the second, third and fourth of said chambers being adapted to contain a fluid; a piston carried by said rod in the third of said chambers; a valve between the second and third of said chambers to permit the flow of fluid only from the second of said chambers into the third of said chambers; a valve between the third and fourth of said chambers to permit the flow of fluid only from the fourth of said chambers into the third of said chambers; said rod being hollow and having openings communicating with the second, third and fourth of said chambers; means whereby the flow of fluid through said openings may be controlled; and means connecting said rod and said axle.

5. The combination with a vehicle having a body and an axle, of a unitary shock absorber comprising a casing mounted on said body; said casing having four chambers; a piston rod reciprocable in said chambers; an abutment in the first of said chambers; resilient means to resist the movement of said rod toward said abutment, said means being between said rod and said abutment, the second, third and fourth of said chambers being adapted to contain a fluid; a piston carried by said rod in the third of said chambers; said rod being hollow and having openings communicating with the second, third and fourth of said chambers; means whereby the flow of fluid through said openings may be controlled; and means connecting said rod and said axle.

6. In a shock absorber a casing; a piston reciprocal within said casing; means to control the movement of said piston; a rod connected to said piston; a pair of rollers mounted on said rod; a forked cam engaging said rollers to actuate said rod; and yieldable means to hold said cam in engagement with said rollers.

LOUIS L. LOMAR.